(12) United States Patent
Narang et al.

(10) Patent No.: US 6,438,800 B1
(45) Date of Patent: Aug. 27, 2002

(54) DOOR HINGE ASSEMBLY FOR AN ELECTRICAL APPLIANCE ENCLOSURE

(75) Inventors: Amit Narang, Hyderbad (IN); Pankaj Gupta, Hyderabad (IN); Edgar Yee, Chapel Hill, NC (US); David Thorn, Burlington, NC (US); Gilbert A. Soares, Mebane, NC (US); Harry Marvin, Mebane, NC (US); Robert Bruce Wallace, Mebane, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/767,122

(22) Filed: Jan. 22, 2001

(51) Int. Cl.⁷ .............................. E05D 5/06; E05D 5/10
(52) U.S. Cl. ............................. 16/389; 16/380; 16/386; 16/262; 16/229
(58) Field of Search .......................... 16/389, 380, 386, 16/268, 270, 262, 229–231; 312/265.1, 265.5, 265.6; 174/48, 66, 67

(56) References Cited

U.S. PATENT DOCUMENTS

| 926,949 | A | * | 7/1909 | Maas | 16/380 |
| 4,455,711 | A | * | 6/1984 | Anderson | 16/229 |
| 4,482,023 | A | * | 11/1984 | Dziedzic et al. | 16/262 |
| 5,259,091 | A | * | 11/1993 | Mordick | 16/254 |
| 5,282,293 | A | * | 2/1994 | Pedoeem | 16/342 |
| 5,555,605 | A | | 9/1996 | Mosher | 16/247 |
| 5,654,871 | A | | 8/1997 | Wentler et al. | 361/622 |
| 5,666,695 | A | | 9/1997 | Jegers et al. | 16/380 |
| 5,722,121 | A | * | 3/1998 | Lau et al. | 16/381 |
| 5,855,042 | A | | 1/1999 | Bruckner | 16/252 |
| 5,927,766 | A | | 7/1999 | Rosen | 292/101 |
| 6,070,297 | A | * | 6/2000 | Borer | 16/389 |
| 6,081,968 | A | | 7/2000 | Walker et al. | 16/252 |

* cited by examiner

Primary Examiner—Chuck Y. Mah
(74) Attorney, Agent, or Firm—Cantor Colburn LLP

(57) ABSTRACT

A door hinge assembly for use in an electrical appliance cabinet includes a door hinge member having a door plate attached to one side of an elbow, a hinge pin sleeve attached to the opposite side of the elbow, and a flange extending upwardly from the elbow. A hinge pin is removably engageable with the hinge pin sleeve, which is further removably engageable with a top edge on the flange.

16 Claims, 3 Drawing Sheets

DOOR HINGE ASSEMBLY FOR AN ELECTRICAL APPLIANCE ENCLOSURE

BACKGROUND OF THE INVENTION

This invention relates generally to a door hinge assembly and, more particularly, to a door hinge assembly for use in an electrical appliance enclosure.

Electrical appliance cabinets, such as motor control centers, are enclosures which typically feature removable doors. The doors are oftentimes shipped apart from the main enclosure. Thereafter, the door is installed on the housing by means of a hinge assembly, which typically includes a hinge and a hinge pin. In most instances, the hinge assembly is included with the door itself.

During shipping, it is desirable to prevent the hinge pin coming out of the hinge and becoming lost. One method of accomplishing this is to simply apply a length of adhesive taping to the hinge pin, thereby keeping it secured directly within the hinge itself or secured to some other area within the door assembly. Alternatively, some manufacturers will opt to attach a temporary "securing member" to the hinge pin, such as a gasket, to keep the pin positioned within the hinge. A third method is to provide a hinge pin having a pair of flexible legs, the ends of which are outwardly bent after insertion into the hinge, thereby locking the pin in place.

In any case, however, it becomes necessary at some point to remove the taping or gasket such that the hinge pin can be temporarily removed from the hinge during installation of the door onto the housing. Once the securing means is disposed of, it may then be difficult to secure or keep track of the hinge pin should the door need to be removed subsequent to its initial installation. This is often the case where it is desired to make repairs within the motor control center, or when it is desired to relocate unit doors within a motor control section. A need, therefore, exists for a hinge assembly which allows for relatively easy insertion and removal of a hinge pin within a hinge, as well as the ability to securely store the hinge pin in a "disengaged" position without the need for an external securing means.

BRIEF SUMMARY OF THE INVENTION

The above discussed and other drawbacks and deficiencies of the prior art are overcome or alleviated by a door hinge assembly for use in an electrical appliance cabinet. In an exemplary embodiment of the present invention, a door hinge assembly for use in an electrical appliance cabinet includes a door hinge member having a door plate attached to one side of an elbow, a hinge pin sleeve attached to the opposite side of the elbow, and a flange extending upwardly from the elbow. A hinge pin is removably engageable with the hinge pin sleeve, which is further removably engageable with a top edge on the flange.

In a preferred embodiment, the flange has a ledge surface formed within the top edge thereof, with the hinge pin being removably engageable with the ledge surface. The flange also includes a notched portion formed within a bottom edge thereof, with the hinge pin being pivotally engageable with the notched portion.

BRIEF DESCRIPTION OF THE DRAWINGS

Referring to the exemplary drawings wherein like elements are numbered alike in the several Figures.

DETAILED DESCRIPTION OF THE INVENTION

Figure 1:
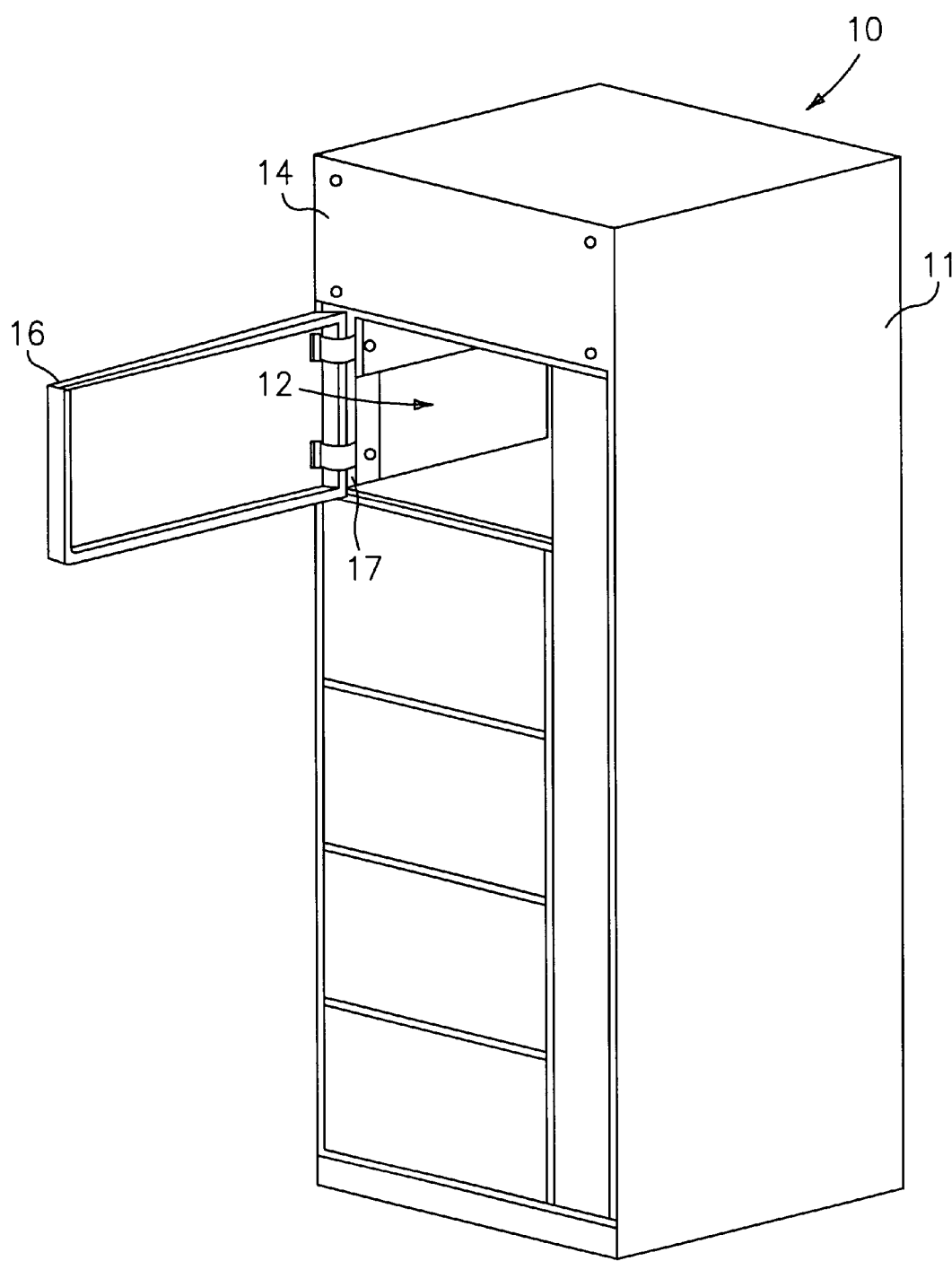
FIG. 1 is a perspective view of a section of a motor control center, having one of its control unit doors in an open position and illustrating a prior art door hinge assembly.

Referring initially to FIG. 1, a motor control center section 10 is shown. The motor control section 10 has a housing 11 containing individual motor control units (not shown) which are positioned inside a control unit compartment 12. In a typical application, several motor control sections 10 are generally placed side by side in an industrial location to control the electrical equipment of a plant. A horizontal bus bar compartment cover 14, located at the top of the motor control section 10, covers the area which houses horizontal bus bars (not shown) and their connection to vertical bus bars (not shown). A supply source supplies electrical power through the horizontal bus bars and vertical bus bars to the individual control units. Each control unit is enclosed in its control compartment 12 with a door 16 pivotally mountable to a door jamb 17 located on housing 11.

Figure 2:
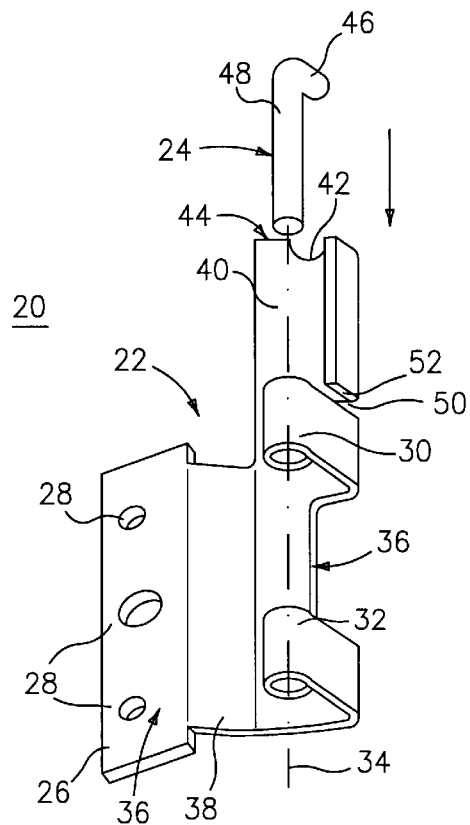
FIG. 2 is a perspective view of an embodiment of the door hinge assembly of the invention.

FIG. 2 illustrates an embodiment of a door hinge assembly 20 used to pivotally mount a door 16 to a door jamb 17 on a motor control center 10. Assembly 20 features a door hinge member 22 and an L-shaped hinge pin 24 which is removably insertable into the hinge member 22. The hinge member 22 is preferably formed from a unitary piece of metal and has a door plate 26 with mounting holes 28 formed therein for securing hinge member 22 to door 16. A pair of hinge pin sleeves includes an upper hinge pin sleeve 30 and a lower hinge pin sleeve 32. Sleeves 30, 32 are generally cylindrically shaped, having a hollow interior therein and are oriented along a common longitudinal axis 34 through which hinge pin 24 is removably engageable. The upper and lower hinge pin sleeves 30, 32 are separated from door plate 26 by opposite ends 36 of an elbow 38.

Figure 3:
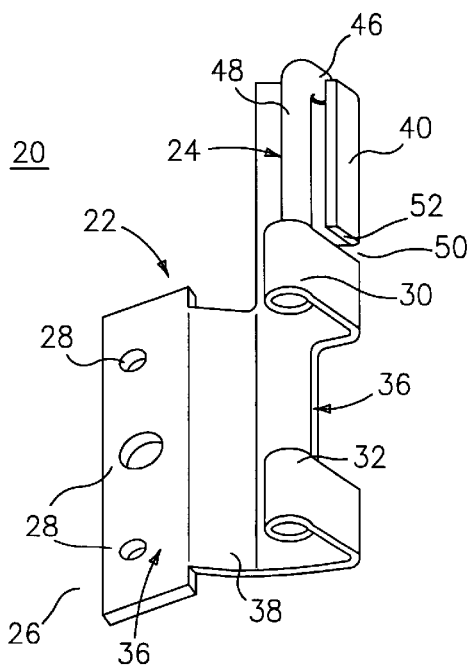
FIG. 3 is another perspective view of the door hinge assembly, illustrating the hinge pin engaged with the flange of the hinge and disengaged from the lower hinge pin sleeve.

Extending upwardly from elbow 38 is a flange 40 which serves as a resting surface for hinge pin 24 when the door 16 is to be removed from housing 11 (FIG. 1). The flange 40 has a ledge surface 42 formed within a top edge 44 thereof. As can be seen in FIG. 3, the ledge surface 42 is of a sufficient width so as to accommodate the foot portion 46 of hinge pin 24 thereon and prevent the leg portion 48 of hinge pin 24 from passing beyond the interior portion of the upper hinge pin sleeve 30 and down into the lower hinge pin sleeve 32.

The flange 40 also features a notched portion 50 formed within a bottom edge 52 thereon. Notched portion 50 allows the foot portion 46 of hinge pin 24 (after insertion through both upper and lower hinge pin sleeves 30, 32) to pivot and lock into place as the door 16 is mounted to housing 11 and closed. Hinge pin 24 is shown engaged with both upper and lower hinge pin sleeves 30, 32 in FIG. 4.

It should be noted that in order for the door 16 to be securely mounted to the housing 11 of motor control center 16, a corresponding mating sleeve (not shown) must be provided on door jamb 17, such that when the mating sleeve is positioned between upper and lower hinge pin sleeves 30, 32 along axis 34, hinge pin 24 may be inserted therethrough.

Figure 4:
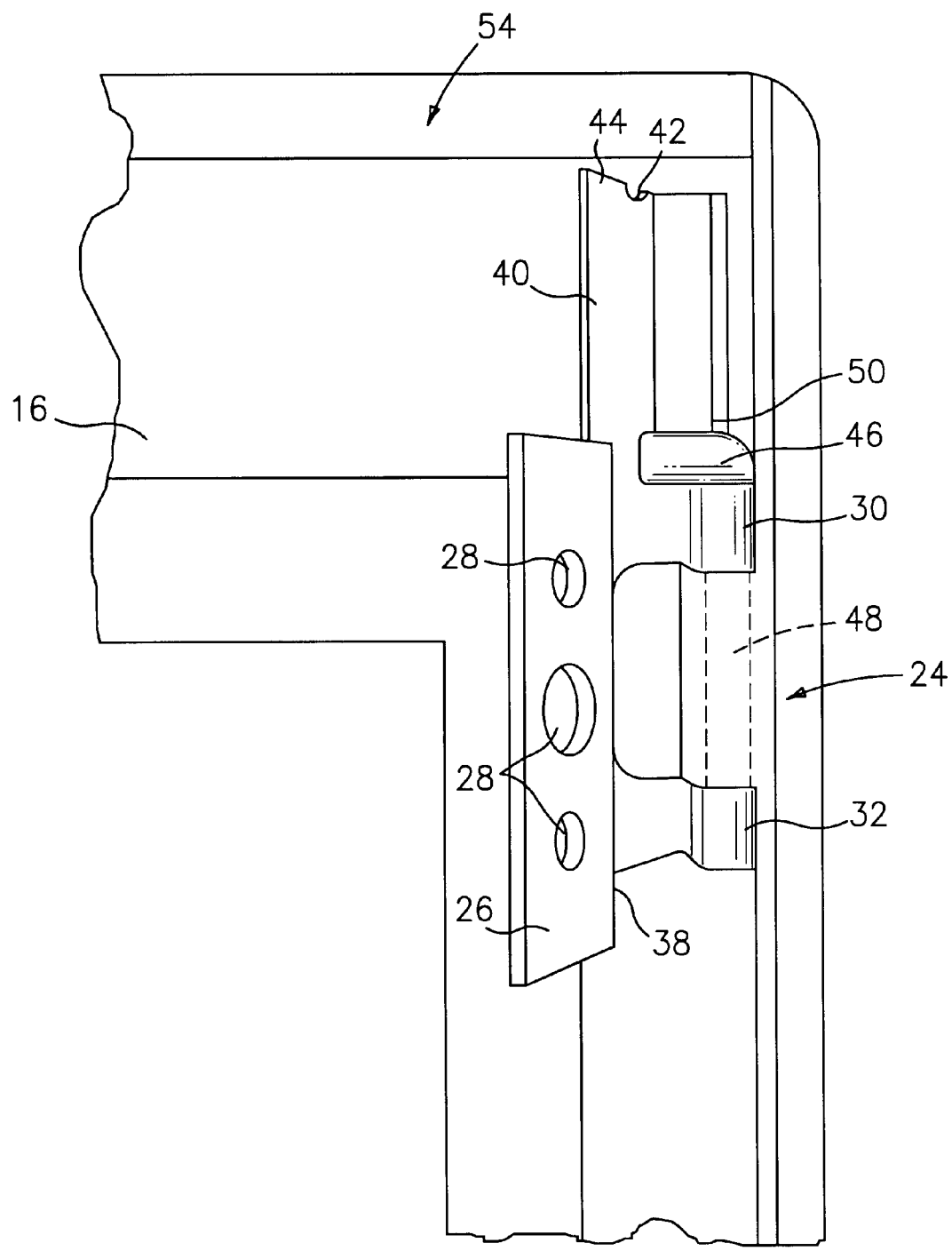
FIG. 4 is another perspective view of the door hinge assembly, mounted within a door of a motor control unit, illustrating the hinge pin disengaged with the flange of the hinge and engaged with the lower hinge pin sleeve.

For illustrative purposes only, hinge pin 24 is shown in its inserted position in FIG. 4 without the corresponding mating sleeve.

Through the use of flange 40, the need for an external securing means, such as adhesive tape or washer is obviated. Ledge surface 42 provides a convenient resting place for hinge pin 24 when removed from lower hinge pin sleeve 32. In addition, hinge assembly 20 may be mounted within the interior of door 16 in a location suitably close enough to the top edge 54 of door 16 such that hinge pin 24 will not slide out from upper hinge pin sleeve 30 if the door 16 is removed and tilted upside down.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A door hinge assembly for use in an electrical appliance cabinet, comprising:
   a door hinge member, said door hinge member further comprising:
      a door plate, attached to one side of an elbow;
      at least one hinge pin sleeve, attached to the opposite side of said elbow; and
   a flange, extending upwardly from said elbow, said flange further comprising:
      a ledge surface formed within a top edge thereof; and
      a notched portion formed within a bottom edge thereof; and
   a hinge pin, removably engageable with said at least one hinge pin sleeve, said hinge pin further removably engageable with said ledge surface, and pivotally engageable with said notched portion.

2. The door hinge assembly of claim 1, wherein said hinge pin is disengaged from said at least one hinge pin sleeve when said hinge pin is engaged with said ledge surface.

3. The door hinge assembly of claim 1, wherein said hinge pin is engaged with said at least one hinge pin sleeve when said hinge pin is engaged with said notched portion.

4. The door hinge assembly of claim 1, wherein said hinge pin is L-shaped.

5. The door hinge assembly of claim 1, wherein said at least one hinge pin sleeve further comprises an upper hinge pin sleeve and a lower hinge pin sleeve.

6. The door hinge assembly of claim 5, wherein said hinge pin is engaged with said upper hinge pin sleeve and disengaged with said lower hinge pin sleeve when said hinge pin is engaged with said ledge surface.

7. The door hinge assembly of claim 5, wherein said hinge pin is engaged with both said upper hinge pin sleeve and said lower hinge pin sleeve when said hinge pin is engaged with said notched portion.

8. The door hinge assembly of claim 5, wherein said upper hinge pin sleeve and said lower hinge pin sleeve are cylindrically shaped.

9. An enclosure for electrical equipment, comprising:
   a housing, having a door pivotally mountable to a door jamb; and
   a door hinge assembly pivotally connecting said door to said door jamb, said door hinge assembly further comprising:
      a door plate mountable to said door;
      at least one hinge pin sleeve, joined to said door plate by an elbow;
      a flange, extending upwardly from said elbow, said flange further comprising:
         a ledge surface formed within a top edge thereof; and
         a notched portion formed within a bottom edge thereof; and
      a hinge pin, removably engageable with said at least one hinge pin sleeve, said hinge pin further removably engageable with said ledge surface, and pivotally engageable with said notched portion.

10. The enclosure of claim 9, wherein said hinge pin is disengaged from said at least one hinge pin sleeve when said hinge pin is engaged with said ledge surface.

11. The enclosure of claim 9, wherein said hinge pin is engaged with said at least one hinge pin sleeve when said hinge pin is engaged with said notched portion.

12. The enclosure of claim 9, wherein said hinge pin is L-shaped.

13. The enclosure of claim 9, wherein said at least one hinge pin sleeve further comprises an upper hinge pin sleeve and a lower hinge pin sleeve.

14. The enclosure of claim 13, wherein said hinge pin is engaged with said upper hinge pin sleeve and disengaged with said lower hinge pin sleeve when said hinge pin is engaged with said ledge surface.

15. The enclosure of claim 13, wherein said hinge pin is engaged with both said upper hinge pin sleeve and said lower hinge pin sleeve when said hinge pin is engaged with said notched portion.

16. The enclosure of claim 13, wherein said upper hinge pin sleeve and said lower hinge pin sleeve are cylindrically shaped.

* * * * *